US012132962B2

(12) United States Patent
Bloch et al.

(10) Patent No.: US 12,132,962 B2
(45) Date of Patent: *Oct. 29, 2024

(54) SYSTEMS AND METHODS FOR NONLINEAR VIDEO PLAYBACK USING LINEAR REAL-TIME VIDEO PLAYERS

(71) Applicant: JBF Interlude 2009 LTD, Tel Aviv-Jaffa (IL)

(72) Inventors: Jonathan Bloch, Brooklyn, NY (US); Tal Zubalsky, Brooklyn, NY (US); Yuval Hofshy, Kfar Saba (IL); Barak Feldman, Tenafly, NJ (US)

(73) Assignee: JBF Interlude 2009 LTD, Tel Aviv (IL)

( * ) Notice: Subject to any disclaimer, the term of this patent is extended or adjusted under 35 U.S.C. 154(b) by 18 days.

This patent is subject to a terminal disclaimer.

(21) Appl. No.: 16/752,193

(22) Filed: Jan. 24, 2020

(65) Prior Publication Data

US 2020/0404382 A1    Dec. 24, 2020

Related U.S. Application Data

(63) Continuation of application No. 14/700,845, filed on Apr. 30, 2015, now Pat. No. 10,582,265.

(51) Int. Cl.
*H04N 21/472* (2011.01)
*H04L 65/61* (2022.01)
(Continued)

(52) U.S. Cl.
CPC ....... *H04N 21/47217* (2013.01); *H04L 65/61* (2022.05); *H04N 21/232* (2013.01);
(Continued)

(58) Field of Classification Search
CPC ............. H04N 21/2387; H04N 21/232; H04N 21/26258; H04N 21/8541; H04L 65/4069
See application file for complete search history.

(56) References Cited

U.S. PATENT DOCUMENTS 4,569,026 A    2/1986  Best
5,137,277 A    8/1992  Kitaue
(Continued)

FOREIGN PATENT DOCUMENTS

CA    2639491 A1    3/2010
DE    2428329 A1    1/1975
(Continued)

OTHER PUBLICATIONS

U.S. Appl. No. 14/884,285, Published as US2017/0178601, Systems and Method for Assembling a Recording Composition, filed Oct. 15, 2015.
(Continued)

*Primary Examiner* — John W Miller
*Assistant Examiner* — Akshay Doshi
(74) *Attorney, Agent, or Firm* — Goodwin Procter LLP

(57) ABSTRACT

Systems and methods for nonlinear media playback using a linear media player are described. In one implementation, a video tree representing a branching video presentation is provided, and a dynamic playlist is provided to a linear video player. A controller component interacts with the linear video player through a standard interface of the linear video player. During playback of a video content segment in the dynamic playlist by the linear video player, an indication of a user interaction with the playing video content segment is received by the controller component and from the linear video player via the standard interface, and the dynamic playlist is modified based on video content segments in a branch of the video tree. In another implementation, an uncompressed media file is selected and combined with a preceding and/or following media file. The combined files are compressed and a portion of the compressed file corresponding to the original media file is extracted.

18 Claims, 14 Drawing Sheets

(51) Int. Cl.
*H04N 21/232* (2011.01)
*H04N 21/2387* (2011.01)
*H04N 21/262* (2011.01)
*H04N 21/6587* (2011.01)

(52) U.S. Cl.
CPC ... *H04N 21/2387* (2013.01); *H04N 21/26258* (2013.01); *H04N 21/6587* (2013.01)

(56) References Cited

U.S. PATENT DOCUMENTS

| | | | |
|---|---|---|---|
| 5,161,034 A | 11/1992 | Klappert | |
| 5,568,602 A | 10/1996 | Callahan et al. | |
| 5,568,603 A | 10/1996 | Chen et al. | |
| 5,597,312 A | 1/1997 | Bloom et al. | |
| 5,607,356 A | 3/1997 | Schwartz | |
| 5,610,653 A | 3/1997 | Abecassis | |
| 5,636,036 A | 6/1997 | Ashbey | |
| 5,676,551 A | 10/1997 | Knight et al. | |
| 5,694,163 A | 12/1997 | Harrison | |
| 5,715,169 A | 2/1998 | Noguchi | |
| 5,734,862 A | 3/1998 | Kulas | |
| 5,737,527 A | 4/1998 | Shiels et al. | |
| 5,745,738 A | 4/1998 | Ricard | |
| 5,751,953 A | 5/1998 | Shiels et al. | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 5,956,037 A | 9/1999 | Osawa et al. | |
| 5,966,121 A | 10/1999 | Hubbell et al. | |
| 5,983,190 A | 11/1999 | Trower, II et al. | |
| 6,067,400 A | 5/2000 | Saeki et al. | |
| 6,091,886 A | 7/2000 | Abecassis | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,020 B1 | 10/2001 | Kumagami | |
| 6,298,482 B1 | 10/2001 | Seidman et al. | |
| 6,460,036 B1 | 10/2002 | Herz | |
| 6,535,639 B1 | 3/2003 | Uchihachi et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,771,875 B1 | 8/2004 | Kunieda et al. | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,296,231 B2 | 11/2007 | Loui et al. | |
| 7,310,784 B1 | 12/2007 | Gottlieb et al. | |
| 7,319,780 B2 | 1/2008 | Fedorovskaya et al. | |
| 7,379,653 B2 | 5/2008 | Yap et al. | |
| 7,430,360 B2 | 9/2008 | Abecassis | |
| 7,444,069 B1 | 10/2008 | Bernsley | |
| 7,472,910 B1 | 1/2009 | Okada et al. | |
| 7,627,605 B1 | 12/2009 | Lamere et al. | |
| 7,650,623 B2 | 1/2010 | Hudgeons et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,202,167 B2 | 6/2012 | Ackley et al. | |
| 8,276,058 B2 | 9/2012 | Gottlieb et al. | |
| 8,281,355 B1 | 10/2012 | Weaver et al. | |
| 8,321,905 B1 | 11/2012 | Streeter et al. | |
| 8,341,662 B1 | 12/2012 | Bassett et al. | |
| 8,350,908 B2 | 1/2013 | Morris et al. | |
| 8,405,706 B2 | 3/2013 | Zhang et al. | |
| 8,600,220 B2 | 12/2013 | Bloch et al. | |
| 8,612,517 B1 | 12/2013 | Yadid et al. | |
| 8,626,337 B2 | 1/2014 | Corak et al. | |
| 8,646,020 B2 | 2/2014 | Reisman | |
| 8,650,489 B1 | 2/2014 | Baum et al. | |
| 8,667,395 B2 | 3/2014 | Hosogai et al. | |
| 8,750,682 B1 | 6/2014 | Nicksay et al. | |
| 8,752,087 B2 | 6/2014 | Begeja et al. | |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 * | 7/2015 | Henry | G11B 27/102 |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,363,464 B2 | 6/2016 | Alexander | |
| 9,367,196 B1 | 6/2016 | Goldstein et al. | |
| 9,374,411 B1 | 6/2016 | Goetz | |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,497,496 B1 | 11/2016 | Corley et al. | |
| 9,510,044 B1 | 11/2016 | Pereira et al. | |
| 9,520,155 B2 | 12/2016 | Bloch et al. | |
| 9,530,454 B2 | 12/2016 | Bloch et al. | |
| 9,531,998 B1 | 12/2016 | Farrell et al. | |
| 9,538,219 B2 | 1/2017 | Sakata et al. | |
| 9,554,061 B1 | 1/2017 | Proctor, Jr. et al. | |
| 9,571,877 B2 | 2/2017 | Lee et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,736,503 B1 | 8/2017 | Bakshi et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 10,070,192 B2 | 9/2018 | Baratz | |
| 10,178,304 B1 | 1/2019 | Tudor et al. | |
| 10,178,421 B2 | 1/2019 | Thomas et al. | |
| 10,187,687 B2 | 1/2019 | Harb et al. | |
| 10,194,189 B1 | 1/2019 | Goetz et al. | |
| 10,257,572 B2 | 4/2019 | Manus et al. | |
| 10,257,578 B1 | 4/2019 | Bloch et al. | |
| 10,310,697 B2 | 6/2019 | Roberts et al. | |
| 10,419,790 B2 | 9/2019 | Gersten | |
| 10,460,765 B2 | 10/2019 | Bloch et al. | |
| 10,523,982 B2 | 12/2019 | Oyman | |
| 10,771,824 B1 | 9/2020 | Haritaoglu et al. | |
| 10,856,049 B2 | 12/2020 | Bloch et al. | |
| 11,003,748 B2 | 5/2021 | Oliker et al. | |
| 2001/0056427 A1 | 12/2001 | Yoon et al. | |
| 2002/0019799 A1 | 2/2002 | Ginsberg et al. | |
| 2002/0029218 A1 | 3/2002 | Bentley et al. | |
| 2002/0053089 A1 | 5/2002 | Massey | |
| 2002/0086724 A1 | 7/2002 | Miyaki et al. | |
| 2002/0089523 A1 | 7/2002 | Hodgkinson | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0120931 A1 | 8/2002 | Huber et al. | |
| 2002/0124250 A1 | 9/2002 | Proehl et al. | |
| 2002/0129374 A1 | 9/2002 | Freeman et al. | |
| 2002/0140719 A1 | 10/2002 | Amir et al. | |

(56) References Cited

U.S. PATENT DOCUMENTS

| | | |
|---|---|---|
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1 | 11/2005 | Stefanik et al. |
| 2005/0251827 A1 | 11/2005 | Ellis et al. |
| 2005/0289582 A1 | 12/2005 | Tavares et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0089843 A1 | 4/2006 | Flather |
| 2006/0120624 A1 | 6/2006 | Jojic et al. |
| 2006/0130121 A1 | 6/2006 | Candelore et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1* | 4/2008 | Harboe ................ G11B 27/34 |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1 | 1/2009 | Hildreth |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0131764 A1 | 5/2009 | Lee et al. |
| 2009/0133051 A1 | 5/2009 | Hildreth |
| 2009/0133071 A1 | 5/2009 | Sakai et al. |
| 2009/0138805 A1 | 5/2009 | Hildreth |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |

(56) References Cited

U.S. PATENT DOCUMENTS

| | | |
|---|---|---|
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0125703 A1* | 5/2014 | Roveta ............... H04N 21/4788 345/633 |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |

(56) References Cited

U.S. PATENT DOCUMENTS

| | | |
|---|---|---|
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0074721 A1 | 3/2015 | Fishman et al. |
| 2015/0104144 A1 | 4/2015 | Minemura |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1 | 8/2015 | Cabanero |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0310660 A1 | 10/2015 | Mogilefsky et al. |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1 | 1/2016 | Zito, Jr. |
| 2016/0029002 A1* | 1/2016 | Balko .............. H04N 21/41407 386/230 |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0344873 A1 | 11/2016 | Jenzeh et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0032562 A1 | 2/2017 | Block et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0060430 A1 | 3/2018 | Lu |
| 2018/0068019 A1 | 3/2018 | Novikoff et al. |
| 2018/0095645 A1 | 4/2018 | Subudhi et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0300852 A1 | 10/2018 | Chen et al. |
| 2018/0300858 A1 | 10/2018 | Chen et al. |
| 2018/0310049 A1 | 10/2018 | Takahashi et al. |
| 2018/0314959 A1 | 11/2018 | Apokatanidis et al. |
| 2018/0376205 A1 | 12/2018 | Oswal et al. |
| 2019/0005716 A1 | 1/2019 | Singh et al. |
| 2019/0066188 A1 | 2/2019 | Rothschild |
| 2019/0069038 A1 | 2/2019 | Phillips |
| 2019/0069039 A1 | 2/2019 | Phillips |
| 2019/0075367 A1 | 3/2019 | van Zessen et al. |
| 2019/0090002 A1 | 3/2019 | Ramadorai et al. |
| 2019/0098371 A1 | 3/2019 | Keesan |
| 2019/0104342 A1 | 4/2019 | Catalano et al. |
| 2019/0132639 A1 | 5/2019 | Panchaksharaiah et al. |
| 2019/0139314 A1 | 5/2019 | Marsh et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0335225 A1 | 10/2019 | Fang et al. |
| 2019/0354936 A1 | 11/2019 | Deluca et al. |
| 2020/0023157 A1 | 1/2020 | Lewis et al. |
| 2020/0029128 A1 | 1/2020 | Erskine |
| 2020/0037047 A1 | 1/2020 | Cheung et al. |
| 2020/0059699 A1 | 2/2020 | Malev et al. |
| 2020/0169787 A1 | 5/2020 | Pearce et al. |
| 2020/0193163 A1 | 6/2020 | Chang et al. |
| 2020/0344508 A1 | 10/2020 | Edwards et al. |
| 2021/0263564 A1 | 8/2021 | Chen et al. |
| 2022/0046291 A1 | 2/2022 | Jiang et al. |
| 2022/0245209 A1 | 8/2022 | Cho et al. |

FOREIGN PATENT DOCUMENTS

| | | |
|---|---|---|
| DE | 2359916 A1 | 6/1975 |
| DE | 004038801 A1 | 6/1992 |
| DE | 10053720 A1 | 4/2002 |
| EP | 0965371 A2 | 12/1999 |

(56) References Cited

FOREIGN PATENT DOCUMENTS

| | | | |
|---|---|---|---|
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008-005288 A | 1/2008 |
| KR | 2004-0005068 A | 1/2004 |
| KR | 2010-0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

U.S. Appl. No. 13/034,645, Published as US2011/0202562, System and Method for Data Mining Within Interactive Multimedia, filed Feb. 24, 2011.
U.S. Appl. No. 13/437,164, now U.S. 8,600,220, Published as US2013/0259442, Systems and Methods for Loading More Than One Video Content at a Time, filed Apr. 2, 2012.
U.S. Appl. No. 13/622,780, now U.S. Pat. No. 8,860,882, Published US2014/0078397, Systems and Methods for Constructing Multimedia Content Modules, filed Sep. 19, 2012.
U.S. Appl. No. 14/639,579, U.S. Pat. No. 10,474,334, Published as US2015/0199116, Progress Bar for Branched Videos, filed Mar. 5, 2015.
U.S. Appl. No. 13/921,536, now U.S. Pat. No. 9,832,516, Published US2014/0380167, Systems and Methods for Multiple Device Interaction with Selectably Presentable Media Streams, filed Jun. 19, 2013.
U.S. Appl. No. 15/356,913, Systems and Methods for Real-Time Pixel Switching, filed Nov. 21, 2016.
U.S. Appl. No. 15/481,916, Published as US 2017-0348460, Systems and Methods for Creating Linear Video From Branched Video, filed Apr. 7, 2017.
U.S. Appl. No. 14/534,626, Published as US-2018-0130501-A1, Systems and Methods for Dynamic Video Bookmarking, filed Sep. 13, 2017.
U.S. Appl. No. 16/865,896, Systems and Methods for Dynamic Video Bookmarking, filed May 4, 2020.
U.S. Appl. No. 17/138,434, Systems and Methods for Dynamic Video Bookmarking, filed Dec. 30, 2020.
U.S. Appl. No. 14/534,626, Published as US2016/0105724, Systems and Methods for Parallel Track Transitions, filed Nov. 6, 2014.
U.S. Appl. No. 16/559,082, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,464, Published as US2017/0178601, Intelligent Buffering of Large-Scale Video, filed Dec. 22, 2015.
U.S. Appl. No. 14/978,491, Published as US2017/0178409, Seamless Transitions in Large-Scale Video, filed Dec. 22, 2015.
U.S. Appl. No. 15/395,477, Published as US2018/0191574, Systems and Methods for Dynamic Weighting of Branched Video Paths, filed Dec. 30, 2016.
U.S. Appl. No. 16/283,066, Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
An ffmpeg and SDL Tutorial, "Tutorial 05: Synching Video," Retrieved from internet on Mar. 15, 2013: <http://dranger.com/ffmpeg/tutorial05.html>, 4 pages.
Archos Gen 5 English User Manual Version 3.0, Jul. 26, 2007, pp. 1-81.
Barlett M, (2008), "iTunes 11: How to Queue Next Song," Technipages, Oct. 6, 2008 issue, pp. 1-8, retrieved on Dec. 26, 2013 from the internet: http://www.technipages.com/itunes-queue-next-song.html.
International Preliminary Report and Written Opinion of PCT/IL2012/000080 dated Aug. 27, 2013, 7 pages.
International Search Report and Written Opinion for International Patent Application PCT/IB2013/001000 mailed Jul. 31, 2013 (12 pages).
International Search Report for International Patent Application PCT/IL2010/000362 dated Aug. 25, 2010 (2 pages).
International Search Report for International Patent Application PCT/IL2012/000081 dated Jun. 28, 2012 (4 pages).
International Search Report of PCT/IL2012/000080 dated Aug. 9, 2012, 4 pages.
iTunes 11: How to Queue Next Song, Published Oct. 6, 2008, pp. 1-8.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Marciel, M. et al., "Understanding the Detection of View Fraud in Video Content Portals", (Feb. 5, 2016), Cornell University, pp. 1-13.
Miller, Gregor et al., "MiniDiver: A Novel Mobile Media Playback Interface for Rich Video Content on an iPhoneTM", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) mailed Jun. 28, 2012 (6 pages).
Supplemental European Search Report for EP13184145, (Jan. 30, 2014), 3 pages.
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
U.S. Appl. No. 12/706,721, now U.S. Pat. No. 9,190,110, Published as US2010/0293455, System and Method for Assembling a Recorded Composition, filed Feb. 17, 2010.
U.S. Appl. No. 14/884,285, now U.S. Pat. No. 11,314,936, Published as US2017/0178601, Systems and Method for Assembling a Recorded Composition, filed Oct. 15, 2015.
U.S. Appl. No. 13/033,916, now U.S. Pat. No. 9,607,655, Published as US2011/0200116, System and Method for Seamless Multimedia Assembly, filed Feb. 24, 2011.
U.S. Appl. No. 13/034,645, now U.S. Pat. No. 11,232,458, Published as US2011/0202562, System and Method for Data Mining Within Interactive Multimedia, filed Feb. 24, 2011.
U.S. Appl. No. 17/551,847, Published as US2021/0366520, Systems and Methods for Data Mining Within Interactive Multimedia, filed Dec. 15, 2021.
U.S. Appl. No. 13/437,164, now U.S. Pat. No. 8,600,220, Published as US2013/0259442, Systems and Methods for Loading More Than One Video Content at a Time, filed Apr. 2, 2012.
U.S. Appl. No. 14/069,694, now U.S. Pat. No. 9,271,015, Published as US2014/0178051, Systems and Methods for Loading More Than One Video Content at a Time, filed Nov. 1, 2013.
U.S. Appl. No. 13/622,780, now U.S. Pat. No. 8,860,882, Published as US2014/0078397, Systems and Methods for Constructing Multimedia Content Modules, filed Sep. 19, 2012.
U.S. Appl. No. 13/622,795, now U.S. Pat. No. 9,009,619, Published as US2014/0082666, Progress Bar for Branched Videos, filed Sep. 19, 2012.

(56) References Cited

OTHER PUBLICATIONS

U.S. Appl. No. 14/639,579, now U.S. Pat. No. 10,474,334, Published as US2015/0199116, Progress Bar for Branched Videos, filed Mar. 5, 2015.
U.S. Appl. No. 13/838,830, now U.S. Pat. No. 9,257,148, Published as US2014/0270680, System and Method for Synchronization of Selectably Presentable Media Streams, filed Mar. 15, 2013.
U.S. Appl. No. 14/984,821, now U.S. Pat. No. 10,418,066, Published as US2016/0217829, System and Method for Synchronization of Selectably Presentable Media Streams, filed Dec. 30, 2015.
U.S. Appl. No. 13/921,536, now U.S. Pat. No. 9,832,516, Published as US2014/0380167, Systems and Methods for Multiple Device Interaction with Selectably Presentable Media Streams, filed Jun. 19, 2013.
U.S. Appl. No. 14/107,600, now U.S. Pat. No. 10,448,119, Published as US2015/0067723, Methods and Systems for Unfolding Video Pre-Roll, filed Dec. 16, 2013.
U.S. Appl. No. 14/335,381, now U.S. Pat. No. 9,530,454, Published as US2015/0104155, Systems and Methods for Real-Time Pixel Switching, filed Jul. 18, 2014.
U.S. Appl. No. 14/139,996, now U.S. Pat. No. 9,641,898, Published as US2015/0181301, Methods and Systems for In-Video Library, filed Dec. 24, 2013.
U.S. Appl. No. 14/140,007, now U.S. Pat. No. 9,520,155, Published as US2015/0179224, Methods and Systems for Seeking to Non-Key Frames, filed Dec. 24, 2013.
U.S. Appl. No. 14/249,627, now U.S. Pat. No. 9,653,115, Published as US2015-0294685, Systems and Methods for Creating Linear Video From Branched Video, filed Apr. 10, 2014.
U.S. Appl. No. 15/481,916, now U.S. Pat. No. 10,755,747, Published as US2017-0345460, Systems and Methods for Creating Linear Video From Branched Video, filed Apr. 7, 2017.
U.S. Appl. No. 16/986,977, Published as US2020/0365187, Systems and Methods for Creating Linear Video From Branched Video, filed Aug. 6, 2020.
U.S. Appl. No. 14/249,665, now U.S. Pat. No. 9,792,026, Published as US2015/0293675, Dynamic Timeline for Branched Video, filed Apr. 10, 2014.
U.S. Appl. No. 14/509,700, now U.S. Pat. No. 9,792,957, Published as US2016/0104513, Systems and Methods for Dynamic Video Bookmarking, filed Oct. 8, 2014.
U.S. Appl. No. 14/534,626, now U.S. Pat. No. 10,692,540, Published as US-2018-0130501-A1, Systems and Methods for Dynamic Video Bookmarking, filed Sep. 13, 2017.
U.S. Appl. No. 16/865,896, now U.S. Pat. No. 10,885,944, Published as US2020/0265870, Systems and Methods for Dynamic Video Bookmarking, filed May 4, 2020.
U.S. Appl. No. 17/138,434, now U.S. Pat. No. 11,348,618, Published as US2021/0366520, Systems and Methods for Dynamic Video Bookmarking, filed Dec. 30, 2020.
U.S. Appl. No. 17/701,168, Published as US2022/0215861, Systems and Methods for Dynamic Video Bookmarking, filed Mar. 22, 2022.
U.S. Appl. No. 14/534,626, Published as US2016/0105724, Systems and Methods for Parallel Track Transitions, filed Mar. 31, 2022.
U.S. Appl. No. 14/700,845, now U.S. Pat. No. 10,582,265, Published as US2016/0323608, Systems and Methods for Nonlinear Video Playback Using Linear Real-Time Video Players, filed Apr. 30, 2015.
U.S. Appl. No. 14/700,862, now U.S. Pat. No. 9,672,868, Published as US2016/0322054, Systems and Methods for Seamless Media Creation, filed Apr. 30, 2015.
U.S. Appl. No. 14/835,857, now U.S. Pat. No. 10,460,765, Published as US2017/0062012, Systems and Methods for Adaptive and Responsive Video, filed Aug. 26, 2015.
U.S. Appl. No. 16/559,082, Published as US2019/0392868, Systems and Methods for Adaptive and Responsive Video, filed Sep. 3, 2019.
U.S. Appl. No. 14/978,464, now U.S. Pat. No. 11,164,548, Published as US2017/0178601, Intelligent Buffering of Large-Scale Video, filed Dec. 22, 2015.
U.S. Appl. No. 14/978,491, now U.S. Pat. No. 11,128,853, Published as US2017/0178409, Seamless Transitions in Large-Scale Video, filed Dec. 22, 2015.
U.S. Appl. No. 17/403,703, Published as US2022/0038673, Seamless Transitions in Large-Scale Video, filed Aug. 16, 2021.
U.S. Appl. No. 15/085,209, now U.S. Pat. No. 10,462,202, Published as US2017/0289220, Media Stream Rate Synchronization, filed Mar. 30, 2016.
U.S. Appl. No. 15/165,373, Published as US2017/0295410, Symbiotic Interactive Video, filed May 26, 2016.
U.S. Appl. No. 15/189,931, now U.S. Pat. No. 10,218,760, Published as US2017/0374120, Dynamic Summary Generation for Real-time Switchable Videos, filed Jun. 22, 2016.
U.S. Appl. No. 15/395,477, now U.S. Pat. No. 11,050,809, Published as US2018/0191574, Systems and Methods for Dynamic Weighting of Branched Video Paths, filed Dec. 30, 2016.
U.S. Appl. No. 17/328,261, Published as US2021/0281626, Systems and Methods for Dynamic Weighting of Branched Video Paths, filed May 24, 2021.
U.S. Appl. No. 15/997,284, Published as US2019/0373330, Interactive Video Dynamic Adaptation and User Profiling, filed Jun. 4, 2018.
U.S. Appl. No. 15/863,191, now U.S. Pat. No. 10,257,578, Dynamic Library Display for Interactive Videos, filed Jan. 5, 2018.
U.S. Appl. No. 16/283,066, now U.S. Pat. No. 10,856,049, Published as US2019/0349637, Dynamic Library Display for Interactive Videos, filed Feb. 22, 2019.
U.S. Appl. No. 17/091,149, Published as US2021/0306707, Dynamic Library Display for Interactive Videos, filed Nov. 6, 2020.
U.S. Appl. No. 16/591,103, Published as US2021/0105433, Systems and Methods for Dynamically Adjusting Video Aspect Ratios, filed Oct. 2, 2019.
U.S. Appl. No. 16/793,205, Published as US2021/0258647, Dynamic adaptation of interactive Video players using behavioral analytics, filed Feb. 18, 2020.
U.S. Appl. No. 16/793,201, now U.S. Pat. No. 11,245,961, Published as US2021/0258640, Systems and Methods for Detecting Anomalous Activities for Interactive Videos, filed Feb. 18, 2020.
U.S. Appl. No. 16/922,540, Published as US2022/0014817, Systems and Methods for Seamless Audio and Video Endpoint Transitions, filed Jul. 7, 2020.
U.S. Appl. No. 17/462,199, Shader-based dynamic Video manipulation, filed Aug. 31, 2021.
U.S. Appl. No. 17/462,222, Shader-based dynamic Video manipulation, filed Aug. 31, 2021.
U.S. Appl. No. 17/334,027, Automated platform for generating interactive Videos, filed May 28, 2021.
U.S. Appl. No. 17/484,604, Discovery engine for interactive Videos, filed Sep. 24, 2021.
U.S. Appl. No. 17/484,635, Video Player Integration within Websites, filed Sep. 24, 2021.
Bodaghi, A. et al., "Personalization of Interactive Recommender Systems for Expert Users", 4th International Conference on the Web Research (ICWR), (2018), pp. 58-62.
Google Scholar search, "Inserting metadata insertion advertising video", Jul. 16, 2021, 2 pages.

\* cited by examiner

Standard

| Address | Length |
|---|---|
| Video A byte: 0 | 10 sec |
| Video A byte: 1000 | 10 sec |
| Video A byte: 2000 | 10 sec |
| Video A byte: 3000 | 10 sec |
| Video A byte: 4000 | 10 sec |
| Video A byte: 5000 | 10 sec |

FIG. 3A

Branching

| Address | Length |
|---|---|
| Video A byte: 0 | 1 sec |
| Video A byte: 100 | 1 sec |
| Video A byte: 200 | 1 sec |
| Video A byte: 300 | 1 sec |
| Video A byte: 400 | 1 sec |
| Video B2 byte: 0 | 1 sec |
| Video B2 byte: 100 | 1 sec |
| Video B2 byte: 200 | 1 sec |
| Video B2 byte: 300 | 1 sec |
| Video C4 byte: 0 | 1 sec |
| Video C4 byte: 100 | 1 sec |

FIG. 3B

| Concatenate | Extract |
|---|---|
| A-B1 | A |
| A-B1-C1 | B1 |
| A-B2-C3 | B2 |
| B1-C1-D1 | C1 |
| B1-C2-D1 | C2 |
| B2-C3-D3 | C3 |
| B2-C4-D3 | C4 |
| C1-D1 | D1 |
| C1-D2 | D2 |
| C3-D3 | D3 |
| C4-D4 | D4 |

FIG. 9B

| Concatenate | Extract |
|---|---|
| A-B1-C1-D1 | A,B1,C1,D1 |
| A-B1-C2-D2 | C2,D2 |
| A-B2-C3-D3 | B2,C3,D3 |
| A-B2-C4-D4 | C4,D4 |

FIG. 9C

SYSTEMS AND METHODS FOR NONLINEAR VIDEO PLAYBACK USING LINEAR REAL-TIME VIDEO PLAYERS

CROSS-REFERENCE TO RELATED APPLICATIONS

This application is a continuation of and claims priority to U.S. patent application Ser. No. 14/700,845, titled "Systems and Methods for Nonlinear Video Playback Using Linear Real-Time Video Players" and filed on Apr. 30, 2015, which is hereby incorporated by reference herein in its entirety.

FIELD OF THE INVENTION

The present disclosure relates generally to nonlinear video playback and, more particularly, to systems and methods for streaming branching video content to a video player that is otherwise limited to the playback of linear video content.

BACKGROUND

Over the past decade there has been an exponential growth in the prevalence of streaming media in the lives of the general public. Users frequently listen to streaming music using services such as Pandora and Spotify, and watch streaming television shows, movies, and video clips from providers such as Hulu, Netflix, and YouTube. Interactive streaming multimedia content, though less common, is also available. Existing forms of interactive videos allow a viewer to make choices on how to proceed through pre-defined video paths; however, this functionality is accomplished using separate video segments that are jumped to upon selection, resulting in a noticeable disconnect in audio and video between consecutive segments. Further, some interactive videos require custom players or other software not readily available to certain viewers. Without access to such software, these viewers are unable to experience any portion of the interactive media.

SUMMARY

Systems and methods for nonlinear video playback using linear real-time video players are described. In one aspect, video tree that represents a branching video presentation is provided. The video tree can have a plurality of branches, with each branch including one or more video content segments. A server provides a dynamic playlist to a linear video player executing on a client device, where the dynamic playlist includes one or more references to video content segments of the video tree to be played by the linear video player. The server can be a remote server and/or a virtual server that executes on the client device. A controller component interacts with the linear video player through a standard interface of the linear video player. During playback of a video content segment in the dynamic playlist by the linear video player, an indication of a user interaction with the playing video content segment is received by the controller component and from the linear video player via the standard interface. The indication can include a decision to traverse a particular branch in the video tree. The dynamic playlist is then modified based on one or more of the video content segments in the particular branch to traverse.

In one implementation, the indication further includes a current playback location of the video and, based on the current playback location, the dynamic playlist is modified. The indication can be received at a controller executing on the client device and provided to the server. The dynamic playlist can be modified by adding and/or removing references to video content segments. The dynamic playlist can also be modified by creating a new dynamic playlist starting from a requested point in time. The dynamic playlist can be modified substantially immediately following the occurrence of the user interaction.

In a further implementation, the linear video player is directed to display a graphical overlay on the playing video content segment. The linear video player can further be directed to modify the graphical overlay based on the user interaction.

In yet another implementation, the server provides a second dynamic playlist to a second linear video player executing on a second client device. The second dynamic playlist can be modified independently of the first dynamic playlist based on indications of user interactions with video content segments played by the second linear video player.

In another aspect, a computer-implemented method includes: (a) selecting an uncompressed media file; (b) identifying, based on the selected uncompressed media file, at least one of a preceding uncompressed media file and a following uncompressed media file; (c) concatenating the selected uncompressed media file and at least one of the preceding uncompressed media file and the following uncompressed media file to form a concatenated uncompressed media file; (d) compressing the concatenated uncompressed media file to form a compressed media file; and (e) selecting a portion of the compressed media file as a compressed version of the selected uncompressed media file. In some implementations, the media file includes audio data.

In one implementation, a video tree is provided that includes a plurality of branches, with each branch having a plurality of media files. The preceding and/or following uncompressed media files can be identified based on a branch of the video tree. Steps (a) through (e) can also be performed for a plurality of media files in the video tree.

In another implementation, the media files in the video tree each include compressed audio data, and compressed audio data of a media file selected from the video tree to is converted uncompressed audio data. The selected uncompressed media file can be concatenated to the end of the preceding uncompressed media file, and the following uncompressed media file can be concatenated to the end of the selected uncompressed media file.

In yet another implementation, the duration of the selected uncompressed media file is stored and the portion is selected based at least in part on the stored duration. An intermediate portion of the compressed media file can be extracted and stored as the compressed version of the selected uncompressed media file. A plurality of portions of the compressed media file can be selected as respective compressed versions of the concatenated uncompressed media files. Playback can occur seamlessly among the compressed versions of the concatenated uncompressed media files.

Aspects of these inventions also include corresponding systems and computer programs. Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 3A and 3B depict example playlists for a standard and branching streaming video player, respectively.

FIGS. 9B and 9C depict example node sets to produce extracted seamless media segments.

DETAILED DESCRIPTION

Figure 1:
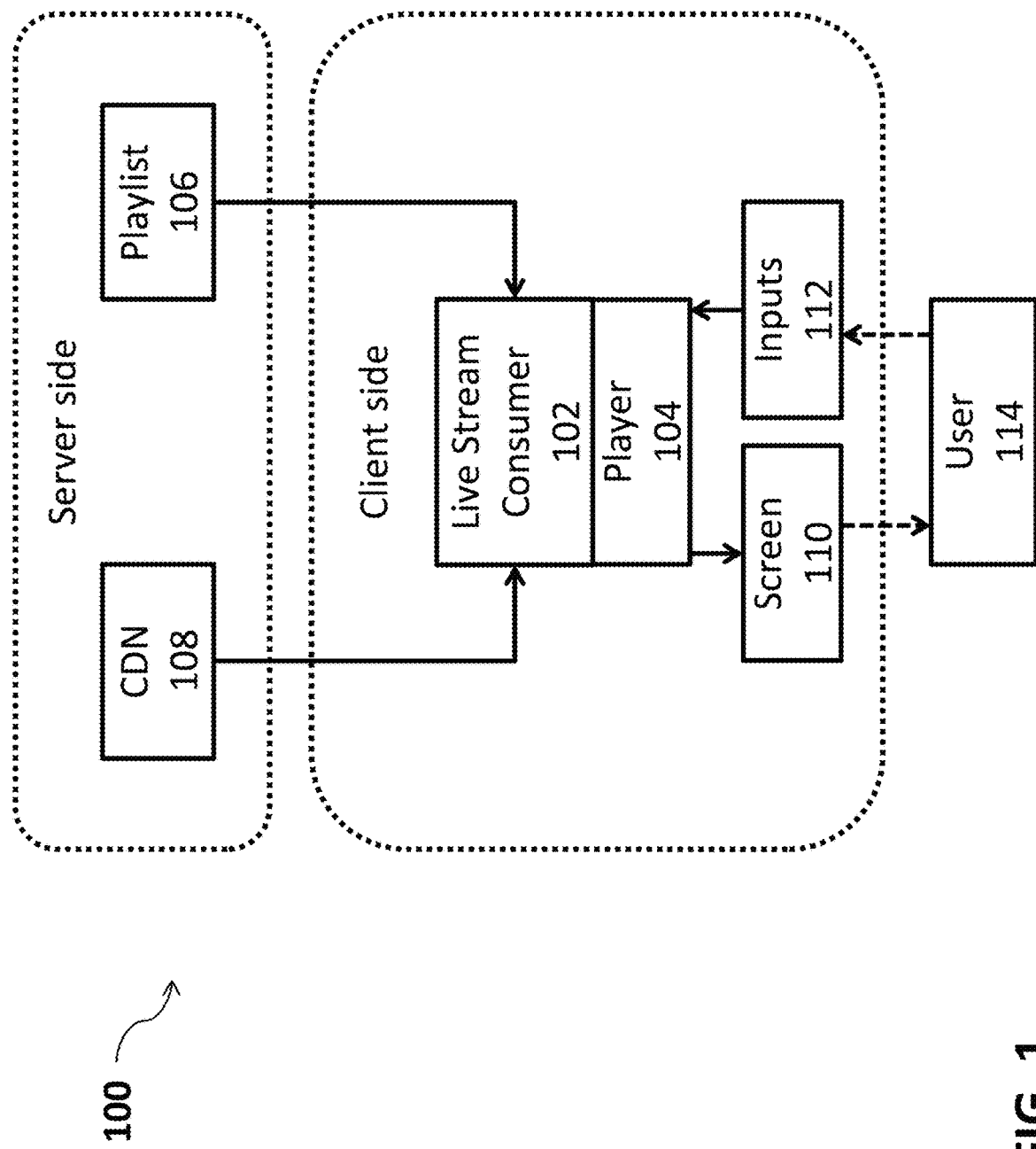
FIG. 1 depicts an example client-server architecture for a standard streaming video player.

Described herein are various implementations of methods and supporting systems for playing non-linear media content with a linear content player. Non-linear content can include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments branch off from a segment, the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple play-throughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

FIG. 1 depicts a client-server architecture 100 for a typical streaming video player capable of playing linear videos. In this implementation, a client-side Live Stream Consumer component 102 receives media files from a content delivery network server 108 or other media server for playback by a media player 104. The media files can be streamed in real-time as the media is being played by the client-side player 104 (e.g., on an end user device). A user 114 can interact with the player 104 by providing inputs 112 to the player 104 via, e.g., basic controls such as play, pause, stop, seek, and volume controls. The user 114 can view the output of the player 104 on a display screen 110 (e.g., a smartphone screen).

A playlist 106 provided by a server and accessible to the client defines the list of media files that are to be provided to the Live Stream Consumer 102. In one example, the playlist 106 includes a static list of all media segments with corresponding references or addresses (e.g., byte offsets or other location indicators in the media being streamed) and times of play. In another example, the playlist 106 includes a single line with a link or reference to a video or several lines with links or references to different parts of a video. The player 104 can also support a dynamic form of the playlist 106, in which entries in the playlist 106 can be added, changed, and/or removed while the player 106 is playing media content and the content is being streamed to the live stream consumer 102.

Figure 2A:
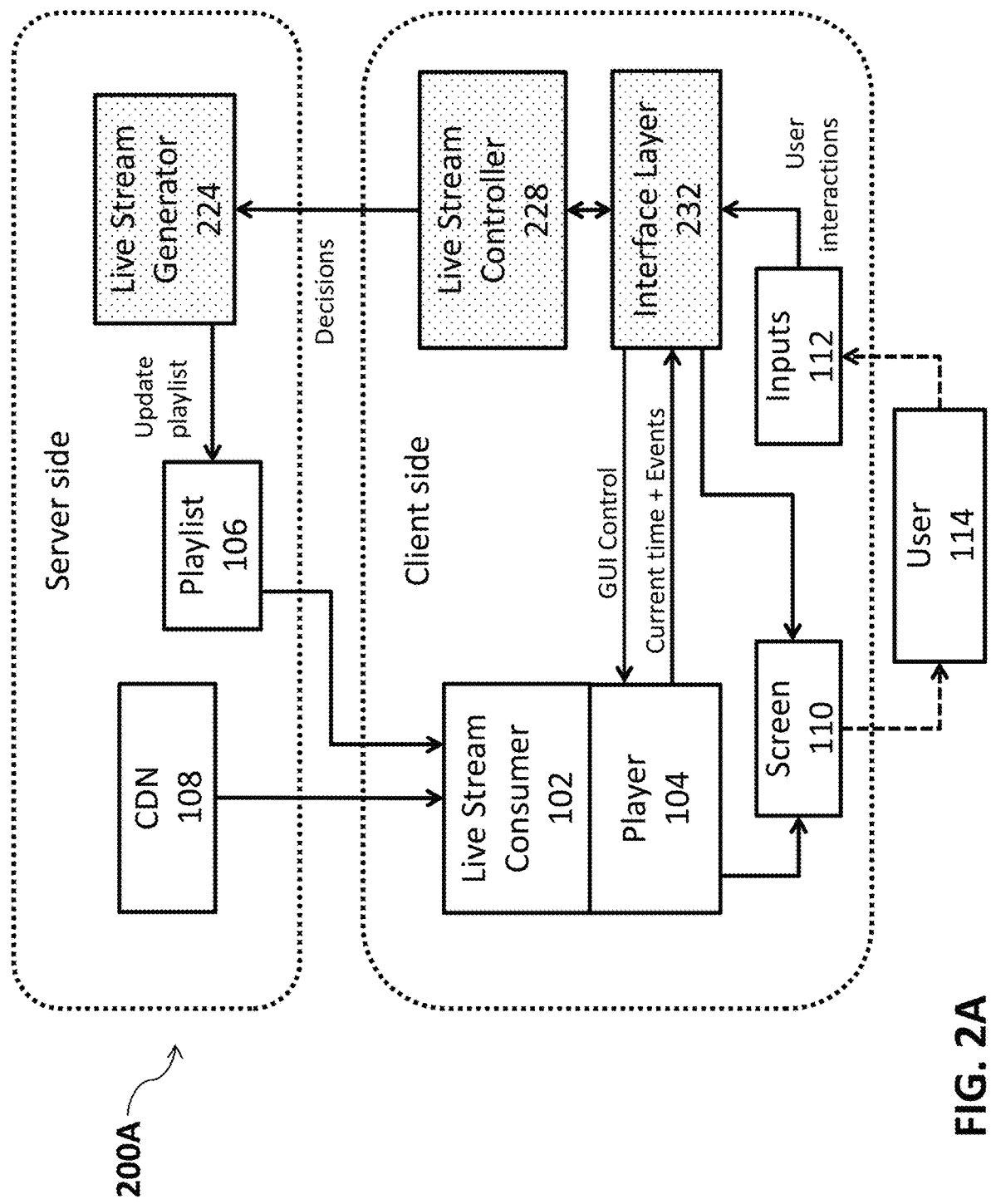
FIGS. 2A and 2B depict example client-server architectures for a standard streaming video player modified to support branching media content.

FIG. 2A depicts one implementation of a client-server architecture 200A for a streaming video player capable of playing branching videos. The client-server architecture 200A improves the standard streaming video player architecture 100 of FIG. 1 by including additional server- and client-side components (shown as shaded) that allow the standard player to support branching video. In other words, a custom video player is not required, and the added components can interface with the existing player through standard or otherwise available interfaces. Advantageously, this approach can be used in platforms that support live streaming protocols based on HTTP (e.g., HTML5 browsers with HTTP Live Streaming (HLS) protocol support, such as that used for Apple® iOS-based devices).

The player 104 plays streaming media according to the playlist 106 and can provide a GUI to be displayed on the screen 110. The player 104 can include a Player Core subcomponent that is responsible for wrapping low-level interactive stream modules and providing a generic framework that can be used by other components of the branching video architecture 200A. The player 104 can manage the manner in which requests are received from other components or applications and how events are fired from lower layers to the components/applications. The player 104 can further include a Player application programming interface (API) composed of standard APIs that other components and applications can use to create interactive experiences (e.g., GUI layers) overlaid on a video or other form of streaming media.

As previously noted, the playlist 106 contains a listing of media segments to be played by the player 106. Referring to FIGS. 3A and 3B, in one implementation, the playlist 106 is a configuration file which holds a list of some or all segments to be streamed and played by the player 104 for a current session. The playlist 106 can include a reference to each segment (e.g., link or address and, if needed, a byte location) and the length of play of the segment. For example, as shown in FIG. 3A, a playlist entry in a playlist used by a standard streaming video player (e.g., as in standard player architecture 100) is "Video A byte:1000 10 sec", where "1000" is the byte location of the video segment corresponding to the entry and "10 sec" is the length of the segment. The standard playlist can be static or dynamic, in that the standard playlist can have entries added, removed, and/or changed in real time. Similarly, as shown in FIG. 3B, a playlist entry in a playlist used by a branching streaming video player (e.g., as in branching player architectures 200A and 200B) is "Video B2 byte: 300 1 sec", where "300" is the byte location of the video segment corresponding to the entry and "1 sec" is the length of the segment. This dynamic playlist 106 can continuously change according to the tree structure of the branching video and received user inputs 112. For example, the playlist 106 can be modified substantially immediately (e.g., immediately but for time allowed for network communication and processing) following a user interaction to reflect a new segment to download based on a user choice.

Referring back to FIG. 2A, on the client side, the Live Stream Consumer component 102 operates in the same manner as in the standard player architecture 100. Specifically, the Live Stream Consumer 102 sets up and manages a video or other media stream received from CDN 108 or other media source. In some instances, the Live Stream Consumer 102 is a component of the client operating system on which the branching video player executes. The Live Stream Consumer 102 interfaces with the standard video player 104, which plays back the streaming content for the user 114 via display screen 110. Of note, the Live Stream Consumer 102 can use the same method of communication with the player 104 as in the standard architecture 100, even though the playlist 106 can be changed in real-time according to user inputs 112.

User inputs 112 are directed to the Interface Layer component 232, on the client side, which creates an interactive layer over video presented by the player 104. The interactive layer can include buttons, timers, progress bars, and/or other interactive components overlaid on the video display, such as that described in U.S. Pat. No. 9,009,619, issued on Apr. 14, 2015, and entitled, "Progress Bar for Branched Videos," the entirety of which is incorporated by reference herein. Some interactive components can appear, disappear, or change based on the currently playing video (e.g., a timer can show the amount of time left in a decision period, buttons can appear that provide options to the user 114 that determine which video branch to traverse, etc.). Other interactive components allow the user 114 to provide inputs 112 to the branching video player (e.g., button selection).

The Interface Layer component 232 synchronizes display of the interactive layer with playback of audio and/or video by receiving timestamp and, in some instances, event information from the player 104. Upon a user interaction with the Interface Layer 232 component, the Interface Layer 232 component can update interactive components on the interactive layer of a playing video as displayed on the screen 110 to ensure synchronization with the audio and/or video.

The Interface Layer component 232 can direct basic playback controls (e.g., play, pause, volume control, etc.) to the standard player 104 so that the player 104 responds to the controls. Communication between the Interface Layer component 232 and the player 104 can be accomplished using standard or other existing interfaces with the player 104, such as web APIs. In one example, this is achieved by manipulating the properties of HTML5 elements (e.g., using the HTMLVideoElement and HTMLAudioElement interfaces). Further, the Interface Layer component 232 can direct certain user decisions or other events (e.g., interactions with a branching video that affect how the video is traversed) to the Live Stream Controller component 228 (discussed further below), which can direct the server-side Live Stream Generator component 224 (discussed further below) to modify the playlist 106.

The client-side Live Stream Controller component 228 receives user input information from the Interface Layer component 232 and, based thereon, communicates to the server-side Live Stream Generator 224 information indicating how a branching video should be traversed (e.g., which video segments should be played or queued). The Live Stream Controller 228 receives from the player 104, via the Interface Layer component 232, the current time/location in the playing video and the user engagement (events). Based on the tree structure of the branching video and the time/event information, the Live Stream Controller 228 determines the next video segment(s) that should be played and/or queued, and transmits this information to the Live Stream Generator 224 for update of the playlist 106 accordingly. In some instances, user inputs 112 are received from the screen 110, instead of or in addition to the player 104. It is to be appreciated that, although the described implementation includes the analysis of the branching video tree structure on the client side, this function can be performed on the server side in other implementations (i.e., the Live Stream Controller 228 can exist on the server side instead of the client side).

The Live Stream Generator component 224 is a lightweight server-side component that manages the media stream to the client in real time via manipulation of the playlist 106, based on information received from the Live Stream Controller 228. While media files can be preloaded onto the CDN 108 or other media server, the decision on while file should be concatenated to the media stream upon user interaction is made in real time by the Live Stream Generator 224. In one implementation, the Live Stream Generator 224 has two interfaces. The first interface is a standard streaming playlist endpoint used by the Live Stream Consumer 102. The playlist 106 is generated dynamically, while media files are received from the CDN 108. The second interface is a control endpoint, used by the Live Stream Controller 228, which receives client-side interactions and responds to them in real-time, as media is being streamed and/or played.

Figure 2B:
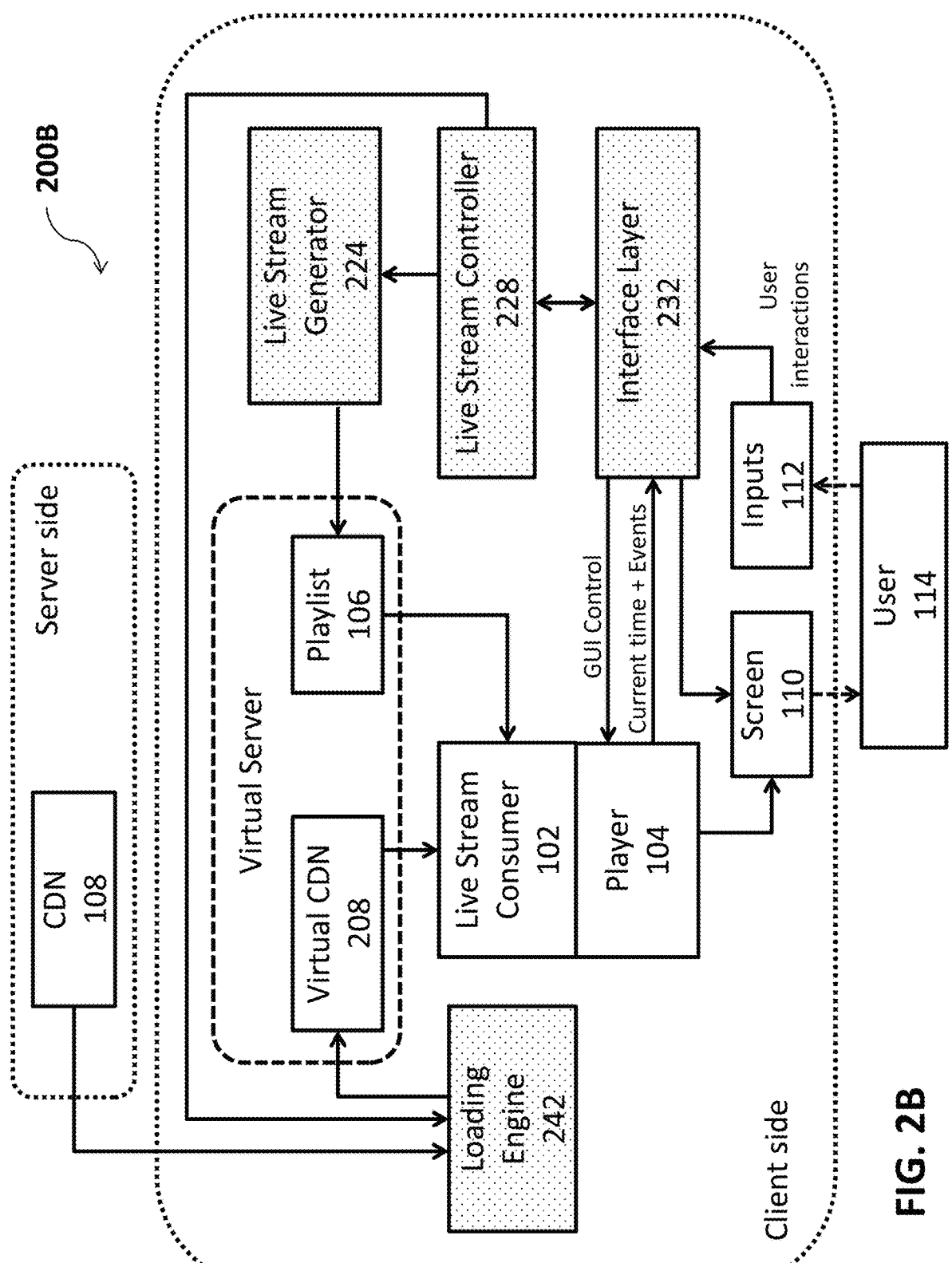

FIG. 2B depicts another implementation of a branching video architecture 200b in which additional functionality is provided on the client side by operating a virtual server on the client. This architecture 200b minimizes the need for data transfer between a client and server, thereby potentially increasing the speed and response time of the branching video player as compared to, for example, the architecture 200a shown in FIG. 2A. Further, this architecture 200b can be used on Apple® iPhone® devices and other devices, where the client side functionality is provided as part of a browser and the virtual server is a lightweight application.

In this example architecture 200b, the client-side virtual server maintains a Virtual CDN 208 and the playlist 106 (rather than having the playlist 106 on the server-side). Client-side components can then interface or otherwise communicate with the virtual server as if it were a remote server. The Live Stream Generator 224 also executes on the client rather than on a remote server. Media is provided to the client by the CDN 108, which is in communication with a Loading Engine component 242 on the client. The Loading Engine 242 preloads videos and other media from the CDN 108 and stores them on a computer-readable medium on the client, where they are accessible via the Virtual CDN 208. Entries in the playlist 106 then map to locations of the storage medium in the Virtual CDN 208 rather than to remote server addresses. The Live Stream Controller 228, which has knowledge of the branching media structure being played, can inform the Loading Engine 242 which media segments are in a potential playback path and, therefore, might need to be requested from the CDN 108.

In one implementation, a compiled mapping component is allows the standard player 104 to interface with the virtual server. Specifically, the Live Stream Consumer 102 accesses the playlist 106 on the virtual server as well as media data via Virtual CDN 208 in the same manner as if the playlist 106 and media were remotely hosted. The playlist 106 can be mapped to the virtual server, and the Virtual CDN 208 can be mapped to the Loading Engine 242. Other components shown in the architecture 200b can operate as described with respect to the architecture 200a shown in FIG. 2A.

Figure 4:
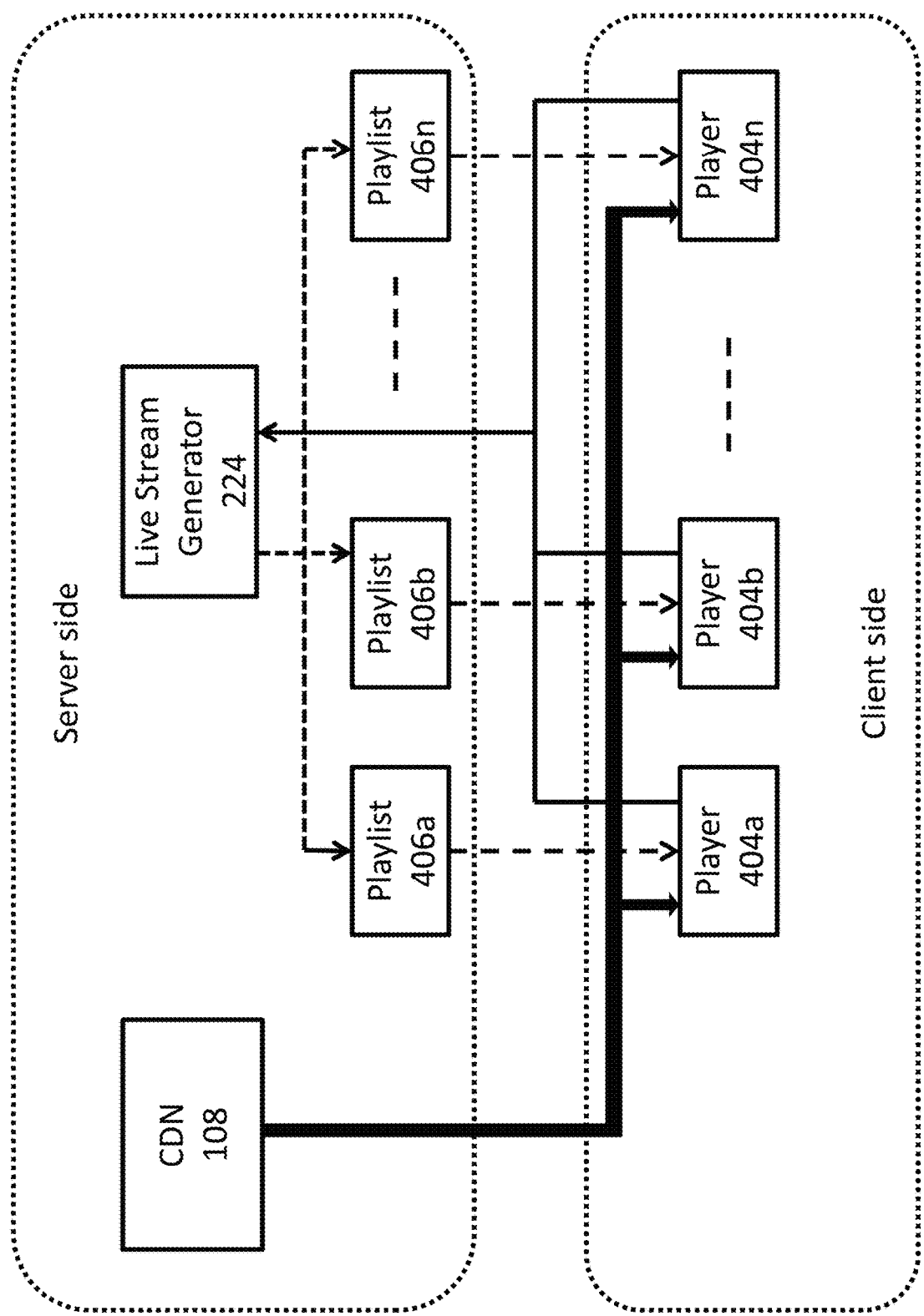
FIG. 4 depicts an example client-server architecture for a standard streaming video player modified to support branching video with multiple clients.

A standard streaming video player architecture (e.g., architecture 100 in FIG. 1) manages a single playlist (even for live, dynamic videos), which multiple video players use to determine which media files will be streamed. However, a branching streaming video player architecture (e.g., architecture 200A in FIG. 2A or architecture 200B in FIG. 2B) can support multiple concurrent sessions with individualized playlists. FIG. 4 illustrates a client-server architecture in which the Live Stream Generator component 224 manages multiple, different playlists 406a . . . 406n for respective client-side players 404a . . . 404n. Each component functions as described in the branching video player architecture 200A or 200B. However, as shown in FIG. 4, the Live Stream Generator 224 receives user input (e.g., decision) information from multiple video players 404a . . . 404n and updates the respective individualized playlists 406a . . . 406n according to user interactions received from potentially different users via the players 404a . . . 404n.

The techniques described herein can be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

The media content described herein can be presented to a user 114 associated with a user device that executes the player 104 and associated components. The user device can be a smartphone, tablet, laptop, palmtop, wireless telephone, television, gaming device, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein.

The described architectures can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The player 104 and associated components can be implemented as native applications, web applications, or other form of software. In some implementations, a particular application is in the form of a web page, widget, and/or Java, JavaScript, .Net, Silverlight, Flash, and/or other applet or plug-in that is downloaded to a user device and runs in conjunction with a web browser. An application and a web browser can be part of a single client-server interface; for example, an application can be implemented as a plugin to the web browser or to another framework or operating system. Any other suitable client software architecture, including but not limited to widget frameworks and applet technology can also be employed.

Media content can be provided to a user device executing the player 104 by CDN 108, which can be a web server, media server, a node in a content delivery network, or other content source. Some or all of the functionality described herein can be implemented in software downloaded to or existing on a user device and, in some instances, some or all of the functionality exists remotely. One of skill in the art will appreciate that certain functions can be performed client side, server side, or both. In some implementations, a user device serves only to provide output and input functionality, with the remainder of the processes being performed remotely.

Clients and servers executing the described functionality can communicate with each other through a communications network. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

Figure 5:
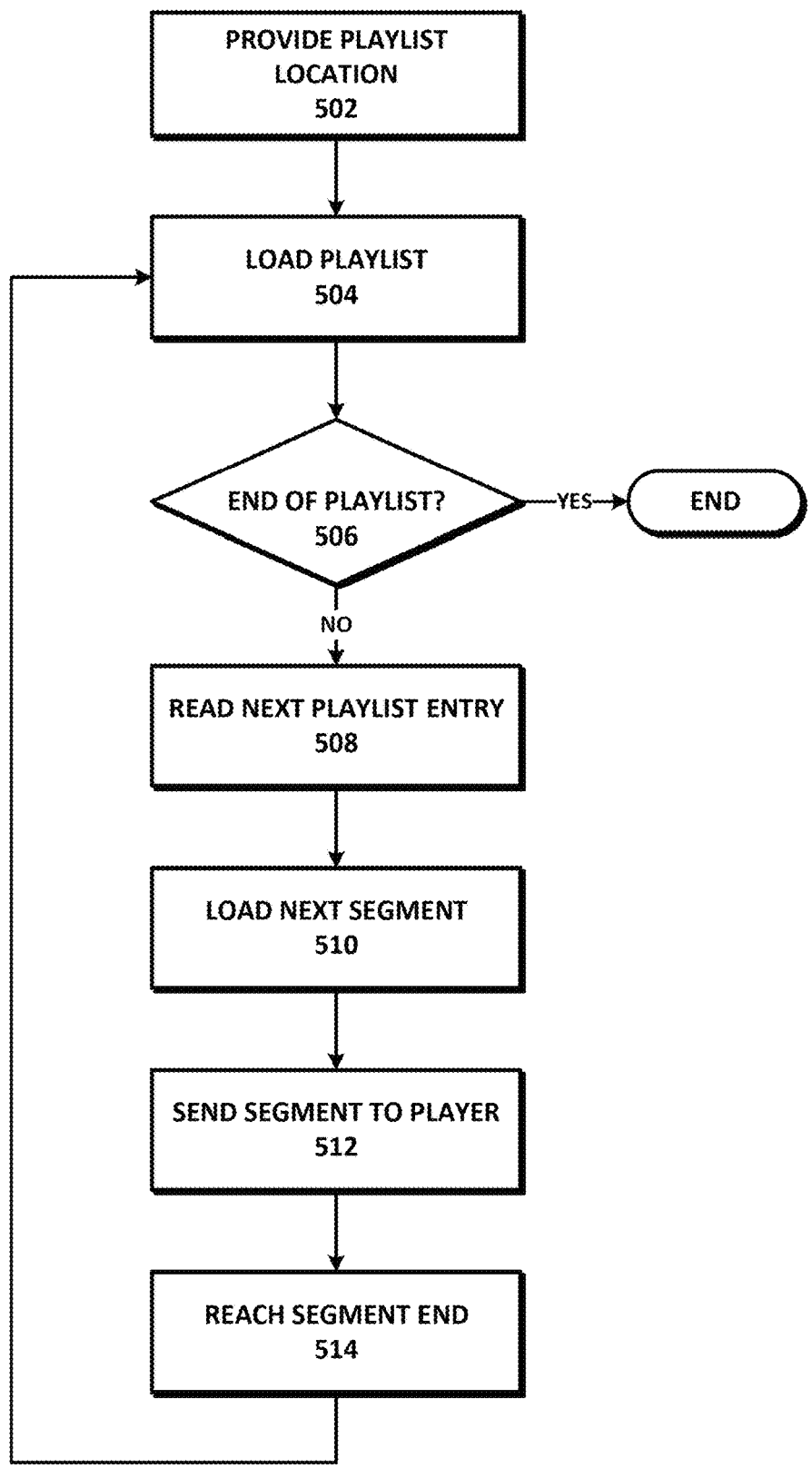
FIG. 5 depicts an example method of playing streaming content using a standard media player.

FIG. 5 depicts one implementation of a process for playing streaming video with a standard streaming video player (e.g., standard player architecture 100 in FIG. 1). In STEP 502, the player 104 provides the location (e.g., a uniform resource identifier) of a playlist 106 to a media consumer component (e.g., Live Stream Consumer 102), which loads the playlist 106 (STEP 504). In STEP 506, if the end of the playlist 106 has been reached, the process completes. Otherwise, the process continues to STEP 508, where the Live Stream Consumer 102 reads the next playlist entry. The Live Stream Consumer 102 loads the media segment specified by the entry (STEP 510) and sends it to the player 104 for playback (STEP 512). Upon reaching the segment end (STEP 514), the process returns to STEP 504, where the Live Stream Consumer 102 reloads the playlist 106 to determine if it has changed.

Figure 6:
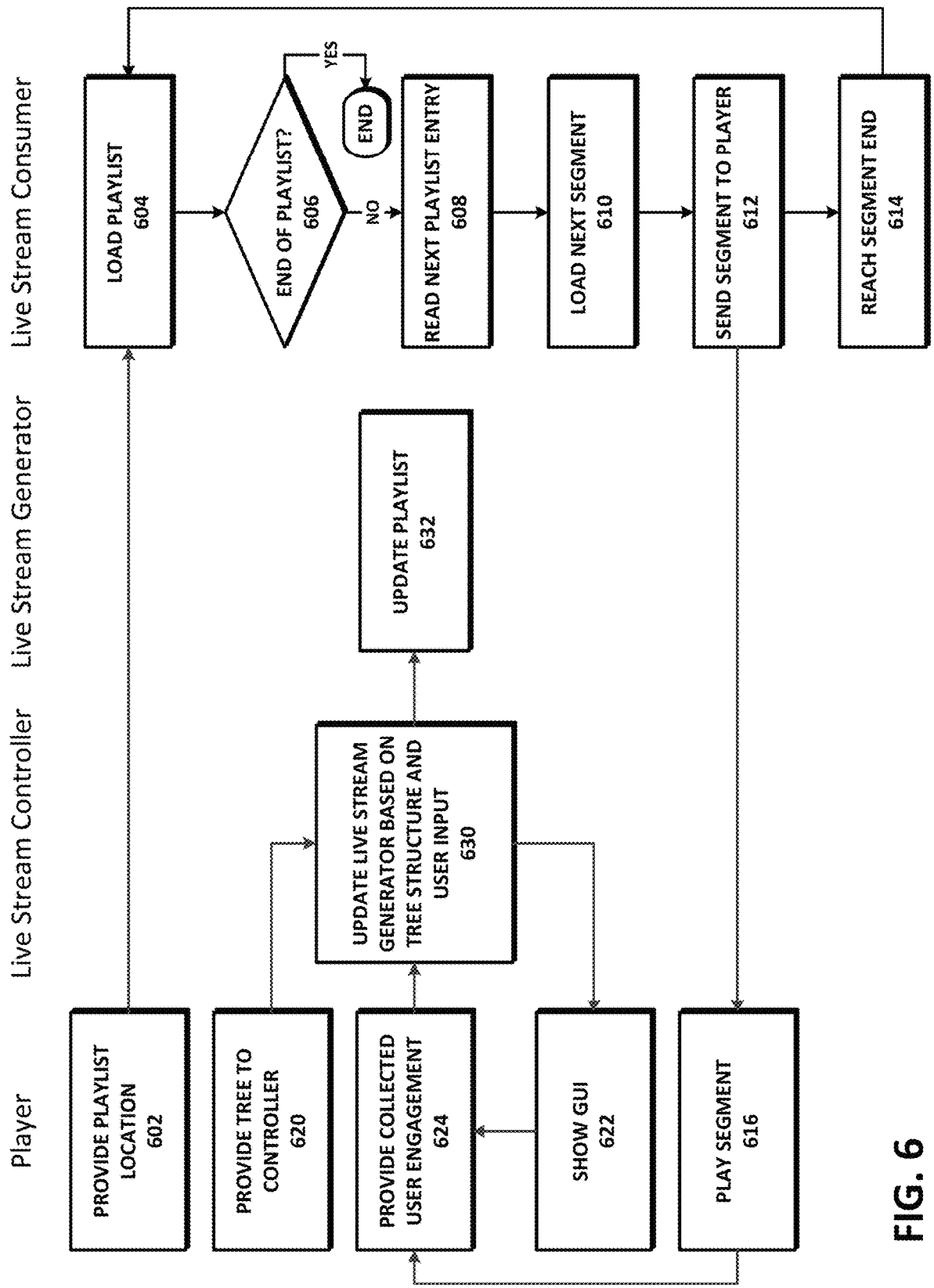
FIG. 6 depicts an example method of playing streaming branching content using a standard media player modified to support branching media content.

FIG. 6 depicts one implementation of a process for playing branching streaming video with a branching streaming video player (e.g., branching player architecture 200A in FIG. 2A or architecture 200B in FIG. 2B). Similarly to the standard player process illustrated in FIG. 5, the player 104 provides a playlist location to the Live Stream Consumer 102 (STEP 602), which loads the playlist 106, reads the playlist entries, load the corresponding segments, sends them to the player 104, and repeats the process until reaching the end of the playlist 106 (STEPS 604 to 614).

In STEP 616, upon receiving a media segment from the Live Stream Consumer 102, the player 104 can play the segment. The player 104 can also display a GUI (e.g., buttons, timers, etc.) overlaid on the playing segment (STEP 622). User interactions with the GUI and the segment playing on the display screen 110, as well as events fired based on interactions or other occurrences, can be collected and provided to the Live Stream Controller 228 (STEP 624). The player 104 can also provide the tree structure associated with a branching video being played to the Live Stream Controller 228 (STEP 620). Based on the received tree structure and user engagement information, the Live Stream Controller 228 updates the Live Stream Generator 224 (STEP 630), which updates the playlist 106 accordingly, as described herein (STEP 632). The Live Stream Controller 228 can also direct a GUI manager that is part of the player 104 to update the GUI shown by the player in to reflect events in the branching video (e.g., display new option buttons, update a running timer, etc.). The updates to the GUI can be synchronized with the branching video played by the player 104.

In one implementation, the player 104 provides a progress bar or timeline that a user can interact with to seek to different locations of a video. When seeking to an earlier location in the video, the branching video player architectures 200A and 200B behaves differently than the standard video player architecture 100. For the standard player architecture 100, when the user seeks to an earlier location, the player 104 need only jump back to a previous playlist entry and continue playback from the corresponding video location. On the other hand, for the branching player architectures 200A and 200B, seeking backwards results in creating a new playlist starting from the requested point in time. This action is taken because of the nature of branching video; i.e., the user can interact differently and make different choices after returning to an earlier point in time and, thus, the segments added to the playlist based on the user interactions are not guaranteed to be the same as the original playlist. For example, referring back to FIG. 3B, if the user were to seek backward to "Video B2 byte: 100 1 sec", a new playlist would be created containing only that entry. Note that, in some implementations, user interactions are recorded by the player 104 and/or Live Stream Controller 228, making it unnecessary to store the interactions in a playlist.

Figure 7:
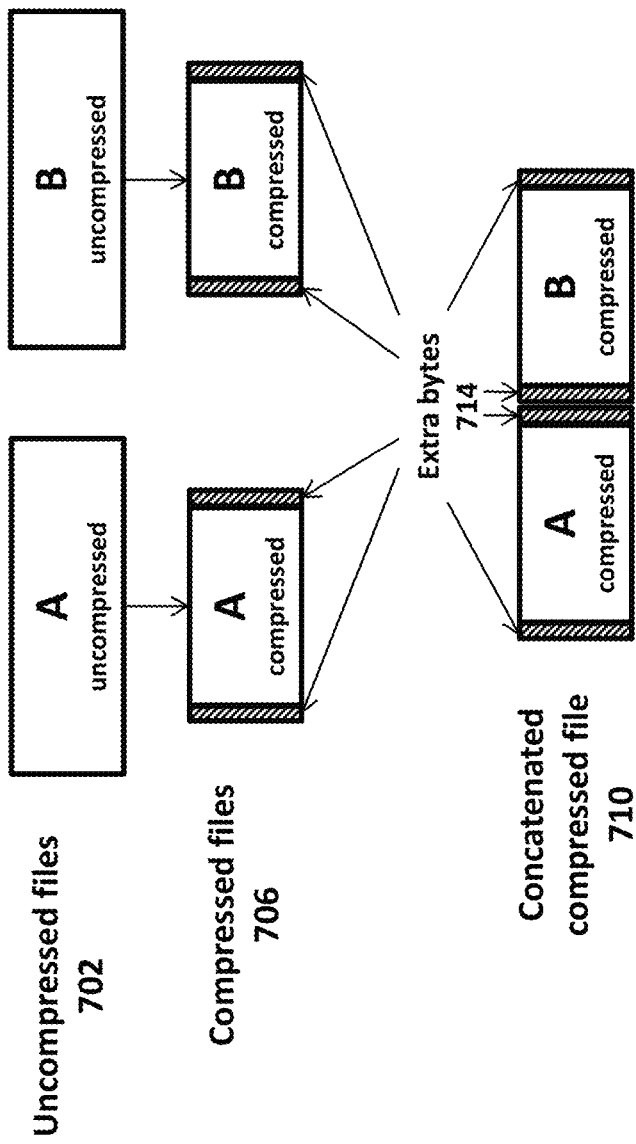
FIG. 7 depicts an example compression and concatenation of media files.

As described above, branching media content segments can be seamless, such that there is no noticeable audio and/or video gap between segments, and the media content appears as a continuous presentation to the viewer. However, when compressing audio files using lossy audio compression, such as MPEG-1 or MPEG-2 Audio Layer III (MP3), extra bytes are added to the beginning and end of the compressed file due to the operation of the decoder and encoder. Thus, as shown in FIG. 7, when uncompressed audio files 702 are converted to compressed versions 706 and are concatenated into a continuous audio file 710, the continuous audio file 710 has gaps in audio where extra bytes 714 were added during encoding.

The Seamless Multimedia Assembly application discloses a technique for replacing uncompressed audio with gapless uncompressed audio for Flash Video (FLV) files. However, this method demands real-time decoding of audio/video files on the client (video player) side and, therefore, does not function in an architecture where a standard streaming video player is enhanced to support branching streaming video, such as described herein. To minimize the amount of work performed in real time while media is streaming and/or being played, the described architecture can include a server-side component that pre-produces seamless segments based on a tree structure associated with branching media content, such that segments retrieved from the cloud already exist in a seamless format and, when a standard player plays the segments one after the other, the result is a seamless presentation.

In one implementation, to create a seamless audio segment, a particular audio segment is identified, as well as the segment preceding it (if any) and the segment following it (if any). The order of segments can be determined based on knowledge of the tree structure associated with a media presentation including the identified audio segment. In one instance, if there are multiple preceding segments and/or multiple following segments, any preceding or following segment, as applicable, can be selected for use with the following technique. If the identified audio segment (or preceding or following segment(s)) is encoded with video and/or exists in a compressed format, the identified audio segment (or preceding or following segment(s)) can be de-multiplexed and/or converted to an uncompressed format as needed.

Figure 8:
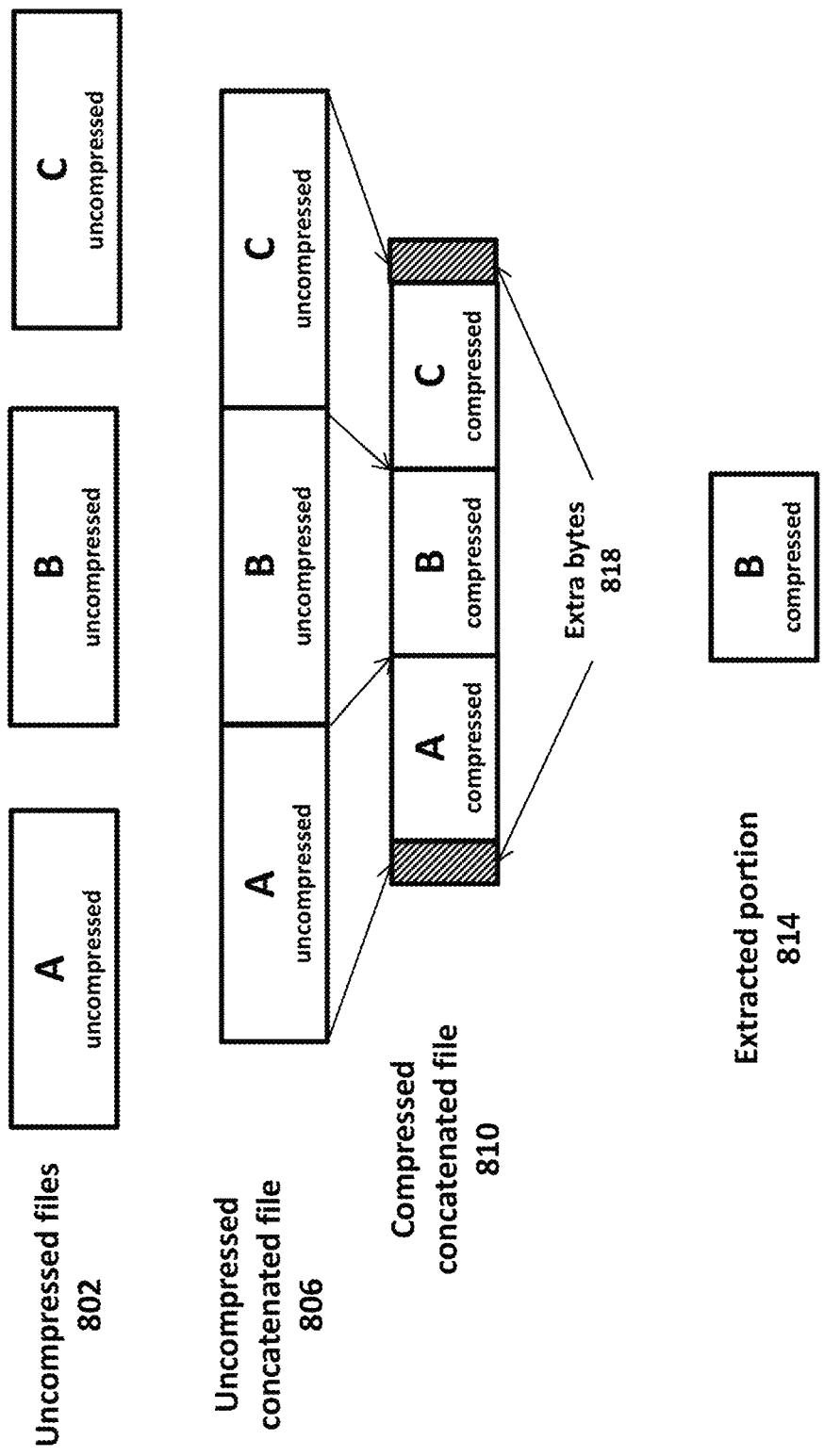
FIG. 8 depicts an example concatenation, compression, and extraction of media files.

Referring to FIG. 8, the uncompressed audio segments 802 (including the identified audio segment B, preceding audio segment A, and following audio segment C) are concatenated into an uncompressed concatenated file 806. The concatenated file 806 is then converted into a compressed format (concatenated compressed file 810) which, because of the nature of the encoder, results in extra bytes 818 existing at the header and/or footer of the compressed file 810. An intermediate portion 814 (e.g., the middle) is then extracted from the compressed concatenated file 810 and is used as the seamless version of the originally identified audio segment. If desired, the extracted intermediate portion 814 can be converted to an uncompressed format.

Figure 9A:
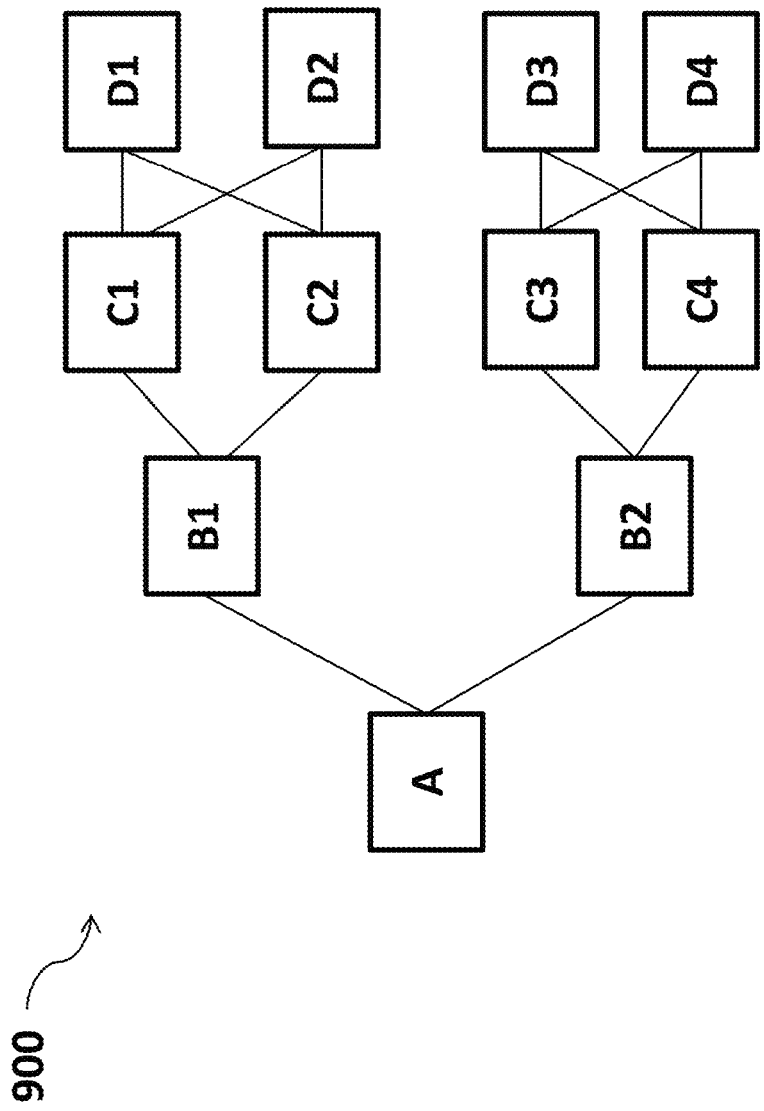
FIG. 9A depicts an example branching tree structure for a media presentation.

In a tree-structured media presentation, the process described above with respect to FIG. 8 can be repeated for some or all nodes having corresponding audio/video segments on the tree. An example tree structure 900 corresponding to an interactive branching video is shown in FIG. 9A. A user watching the interactive video can make choices during the presentation that result in the user traversing a path consisting of {A, B1, C2, D2}, where the audio/video segments associated with those nodes are seamlessly joined so that the user experiences a continuous presentation without noticeable gaps, jumps, buffering, or other similar delays. Other paths defined by the nodes in the tree structure 900 and connections therebetween are possible.

FIG. 9B depicts one implementation of the seamless audio segment creation process applied to the tree structure 900 of FIG. 9A. In this example, if a node has multiple preceding nodes, any one of them can be chosen as the preceding node and, if a node has multiple following nodes, any one of them can be chosen as the following node. If a node is at the beginning of a path, a preceding node is unnecessary. Likewise, if a node is at the end of a path, a following node is not needed. Thus, to obtain a seamless version of each node in the tree structure 900, the groupings shown in FIG. 9B under the heading "Concatenate" are made, and the resulting seamless nodes are listed under the heading "Extract," for each corresponding row. For example, to obtain a seamless version of segment B1, nodes {A, B1, C1} are concatenated and compressed, and the portion corresponding to B1 is extracted. As another example, to obtain a seamless version of segment D4, nodes {C4, D4} are concatenated and compressed, and the portion corresponding to D4 is extracted. In the previous example, only two nodes are concatenated because there is no node following D4. Note, however, that other groupings are possible to obtain a seamless version of any particular node in the tree structure 900. For example, a seamless version of C2 can be obtained using either {B1, C2, D1} or {B1, C2, D2}. Further, for a grouping such as {C1, D1}, either or both of C1 and D1 can be extracted as seamless segments.

In another implementation, more than three segments corresponding to nodes in the tree structure 900 can be concatenated and compressed, and more than one segment portion can be extracted from the concatenated compressed file. For example, referring to FIG. 9C, the segments corresponding to nodes {A, B1, C1, D1} can be combined and compressed, and seamless segments corresponding to all four can be extracted. The foregoing technique allows the nodes corresponding to a particular tree structure to be processed and seamless segments obtained using fewer, and in some cases a minimal number of, operations compared to the creation of one seamless segment at a time.

Figure 10A:
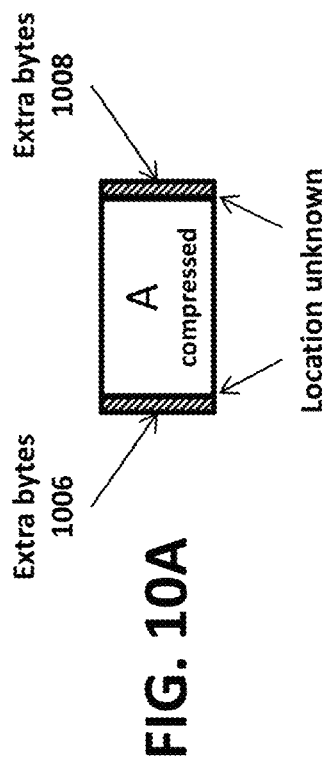
FIGS. 10A and 10B depict example compression and concatenation of media files.
Figure 10B:
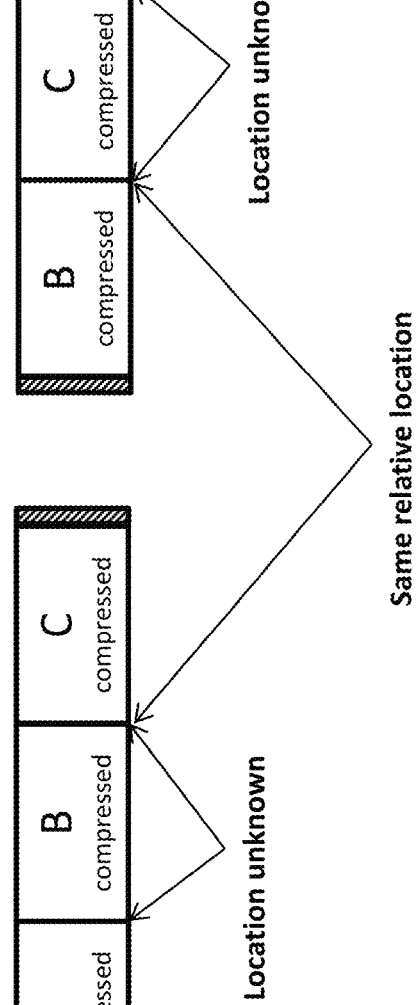

Referring now to FIG. 10A, in one implementation, when a media file (A) is compressed it may become sample inaccurate, meaning that the exact sample location of the cut (to obtain the file portion between the extra bytes 1006, 1008 at the beginning and end of the file, respectively) is unknown. As such, if a segment is compressed by itself (no concatenation), then the seamless portion cannot be accurately extracted. On the other hand, as shown in FIG. 10B, when multiple segments are combined, the exact sample location is still unknown, but the cut between two particular segments (here, B and C) occurs in the same location relative to the two segments regardless of their position in a concatenated compressed file.

Figure 11:
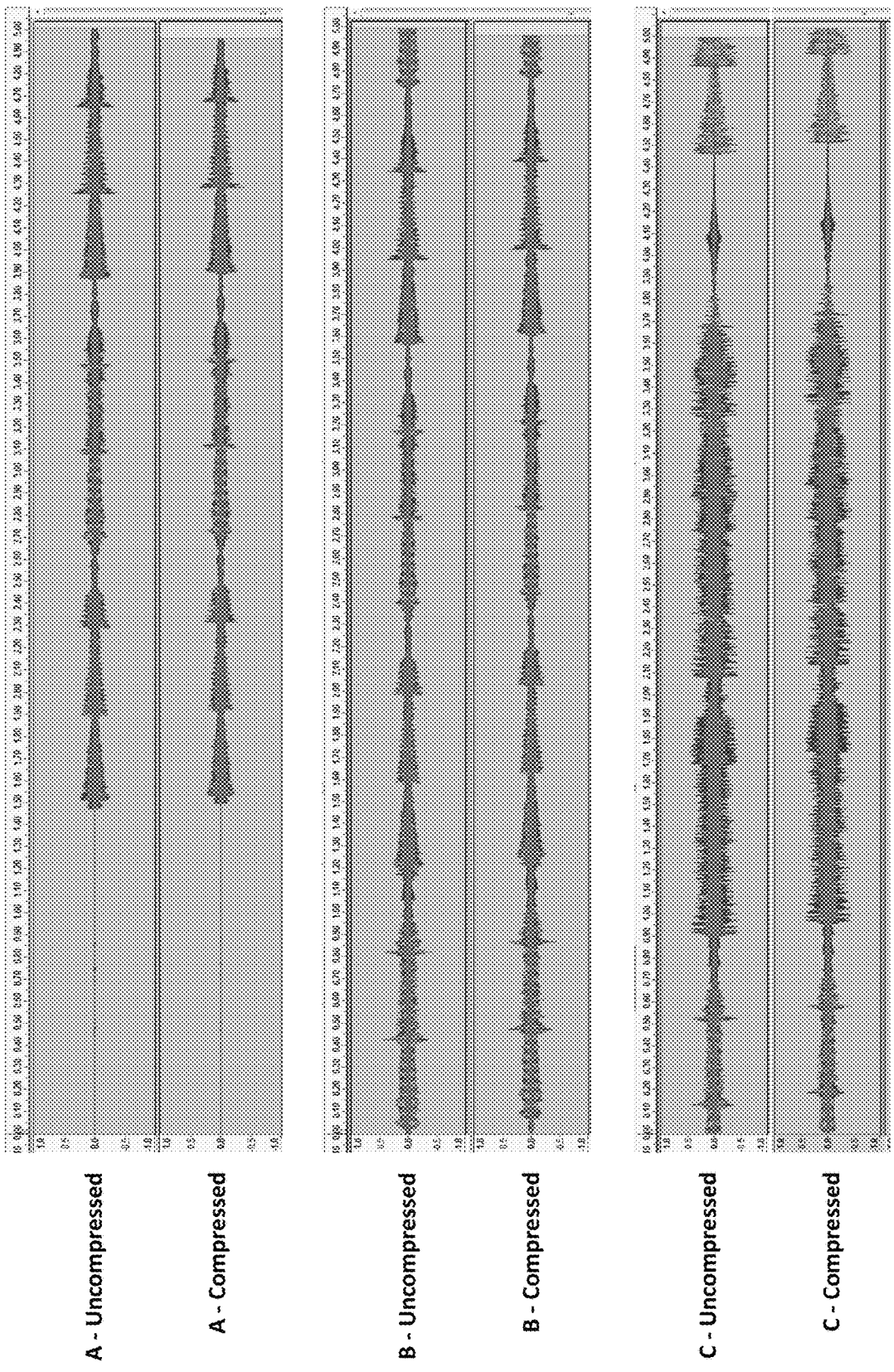
FIG. 11 depicts example waveforms of compressed and uncompressed versions of media files.

FIG. 11 shows the effects of waveform compression on three segments {A, B, C} to which the seamless version creation process is applied. Of note, the audio for the compressed version of segment A begins slightly later and ends sooner than the audio for the uncompressed version of segment A. The end portion of the uncompressed segment A that does not appear in the compressed version is moved to the beginning of the compressed version of segment B. Likewise, an end portion of the uncompressed version of B that does not appear in the compressed version is moved to the beginning of the compressed version of segment C. Although certain portions of audio data are shifted between separate segment file boundaries, the extracted compressed segments operate as segment versions that can be seamlessly joined to one another.

Figure 12:
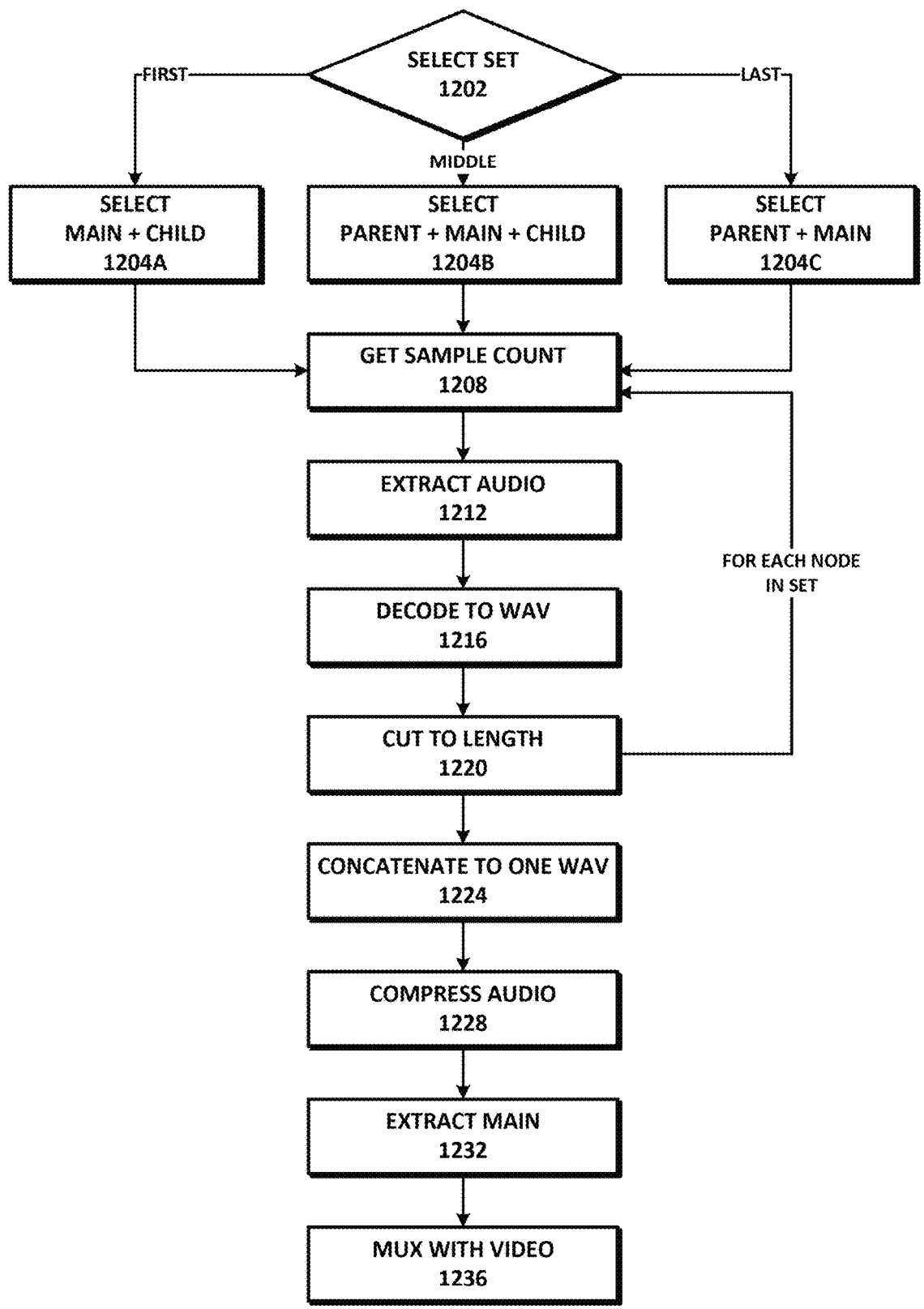
FIG. 12 depicts an example method for creating a seamless version of a media segment.

FIG. 12 depicts one implementation of a method for creating a seamless audio segment from a collection of compressed audio/video segments that have an order defined by, e.g., a tree structure. In STEP 1202, a subset of the compressed segments is selected (e.g., two, three, or more segments). In this example, two or three segments corresponding to nodes of a tree structure are selected. Possible selections include a main node and its child (e.g., the main node is the first node in a path of the tree structure) (STEP 1204A); a main node and its parent and child (e.g., the main node has one or more preceding and following nodes) (STEP 1204B); and a main node and its parent (e.g., the main node is the last node in a path of the tree structure) (STEP 1204C).

Because, in this example, the segments associated with the selected nodes exist in a compressed audio/video format, the uncompressed audio segments are obtained by determining the sample count, extracting (e.g., de-multiplexing) the audio, decoding the audio to an uncompressed format (e.g., .WAV) and, if necessary, trimming the uncompressed audio to its original or other length (STEP 1208 to STEP 1220). As one example, audio in a compressed .OGG format can be converted to an uncompressed .WAV format using FFmpeg with command line options as follows: "ffmpeg -i n.ogg -vn -c:a pcm_s16le -ac 2 -ar 44100 -y out.wav". The foregoing steps can be applied to each node in the selected set of segments.

In STEP 1224, the uncompressed audio segments are concatenated to a single file and, in STEP 1228, the file is compressed using, e.g., WebM or other suitable compression techniques. As one example, the single file in .WAV format can be encoded into a compressed audio file using FFmpeg with command line options as follows: "ffmpeg -i in.wav -vn -c:a libvorbis -b:a 112k -y outAudio.webm". The portion of the compressed concatenated file corresponding to the main segment is then extracted (STEP 1232) and, if desired, can be multiplexed with its corresponding video portion to create a seamless audio/video segment (STEP 1236). An example command to extract the main segment from an audio WebM file using FFmpeg is: "ffmpeg -i outAudio. webm -vn -c:a copy -ss {duration of parent segment} -t (duration of main segment) -y mainAudio.webm", where the duration values are given in seconds with a precision of milliseconds. Further, an example command to multiplex the resulting main segment audio with the corresponding main segment video using FFmpeg is as follows: "ffmpeg -i mainVideo.webm -i mainAudio.webm -c copy -map 0:v -map 1:a -map -0:a -map -1:v -y main.webm". The method illustrated in FIG. 12 can be repeated for all or a subset of nodes in a particular tree structure.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
transforming a linear video player executing on a client device into a non-linear video player, wherein the linear video player does not natively support features of (i) presenting branching video content to a user and (ii) receiving user interactions with the branching video content to cause traversal of different paths within the branching video content, and wherein the non-linear video player supports the features, and
wherein the transforming comprises receiving, over a network from a server, by the linear video player executing on the client device, a controller component configured to operate locally on the client device, communicate with the linear video player through an interface layer, and communicate with the server over the network, wherein the interface layer includes at least one interactive component overlaid on a video presentation being presented by the linear video player and is configured to communicate with the linear video player through an application programming interface (API), and
wherein the linear video player is configured to receive the video presentation from the server via a video input interface that is separate from the API;
receiving, by the interface layer, through the API, timing information from the linear video player associated with the video presentation being presented by the linear video player, wherein the interface layer is configured to synchronize presentation of the at least one interactive component with the video presentation based on the timing information;
receiving, by the interface layer, during playback of a video segment within the video presentation by the linear video player, a user interaction with the at least one interactive component;
providing, by the interface layer, information associated with the user interaction to the controller component, the controller component being configured to direct at least a portion of the information to the server; and
causing the linear video player, based on the user interaction, to emulate the features of the non-linear video player by programmatically directing operation of the linear video player, by the interface layer, through the API, wherein the interface layer is configured to provide at least one playback control to the linear video player via the API based on the user interaction.

2. The method of claim 1, further comprising:
receiving, from the server, a dynamic playlist, by the linear video player executing on the client device, the dynamic playlist comprising one or more references to video segments within a branching video tree to be played by the linear video player; and
in response to the user interaction, modifying the dynamic playlist.

3. The method of claim 2, wherein the dynamic playlist is modified based on a current playback location of the video segment when the user interaction is received.

4. The method of claim 2, wherein modifying the dynamic playlist comprises adding a reference to a video segment to the dynamic playlist and/or removing a reference to a video segment from the dynamic playlist.

5. The method of claim 2, wherein modifying the dynamic playlist comprises creating a new dynamic playlist starting from a requested point in time.

6. The method of claim 2, wherein the dynamic playlist is modified substantially immediately following the receiving of the user interaction.

7. The method of claim 2, wherein the dynamic playlist is a first dynamic playlist, the method further comprising receiving, from the server, a second dynamic playlist, by a second linear video player executing on a second client device.

8. The method of claim 7, further comprising modifying the second dynamic playlist independently of the first dynamic playlist, the modifying being based on user interactions with video segments played by the second linear video player.

9. The method of claim 1, further comprising modifying, by the interface layer, the at least one interactive component based on the user interaction.

10. A system comprising:
a processor; and
a memory for storing computer-executable instructions that, when executed by the processor, program the processor to perform operations comprising:
   transforming a linear video player executing on a client device into a non-linear video player, wherein the linear video player does not natively support features of (i) presenting branching video content to a user and (ii) receiving user interactions with the branching video content to cause traversal of different paths within the branching video content, and wherein the non-linear video player supports the features, and
   wherein the transforming comprises receiving, over a network from a server, by the linear video player executing on the client device, a controller component configured to operate locally on the client device, communicate with the linear video player through an interface layer, and communicate with the server over the network, wherein the interface layer includes at least one interactive component overlaid on a video presentation being presented by the linear video player and is configured to communicate with the linear video player through an application programming interface (API), and
   wherein the linear video player is configured to receive the video presentation from the server via a video input interface that is separate from the API;
   receiving, by the interface layer, through the API, timing information from the linear video player associated with the video presentation being presented by the linear video player, wherein the interface layer is configured to synchronize presentation of the at least one interactive component with the video presentation based on the timing information;
   receiving, by the interface layer, during playback of a video segment within a video presentation by the linear video player, a user interaction with the at least one interactive component;
   providing, by the interface layer, information associated with the user interaction to the controller component, the controller component being configured to direct at least a portion of the information to the server; and
   causing the linear video player, based on the user interaction, to emulate the features of the non-linear video player by programmatically directing operation of the linear video player, by the interface layer, through the API, wherein the interface layer is configured to provide at least one playback control to the linear video player via the API based on the user interaction.

11. The system of claim 10, wherein the operations further comprise:
   receiving, from the server, a dynamic playlist, by the linear video player executing on the client device, the dynamic playlist comprising one or more references to video segments within a branching video tree to be played by the linear video player; and
   in response to the user interaction, modifying the dynamic playlist.

12. The system of claim 11, wherein the dynamic playlist is modified based on a current playback location of the video segment when the user interaction is received.

13. The system of claim 11, wherein modifying the dynamic playlist comprises adding a reference to a video segment to the dynamic playlist and/or removing a reference to a video segment from the dynamic playlist.

14. The system of claim 11, wherein modifying the dynamic playlist comprises creating a new dynamic playlist starting from a requested point in time.

15. The system of claim 11, wherein the dynamic playlist is modified substantially immediately following the receiving of the user interaction.

16. The system of claim 11, wherein the dynamic playlist is a first dynamic playlist, wherein the operations further comprise receiving, from the server, a second dynamic playlist, by a second linear video player executing on a second client device.

17. The system of claim 16, wherein the operations further comprise modifying the second dynamic playlist independently of the first dynamic playlist, the modifying being based on user interactions with video segments played by the second linear video player.

18. The system of claim 10, wherein the operations further comprise modifying, by the interface layer, the at least one interactive component based on the user interaction.

* * * * *